April 27, 1948.   J. E. ANDERSON   2,440,532
CLAMPING DEVICE FOR CABLES AND WIRES AND RODS
Filed Feb. 1, 1944

INVENTOR.
JOHN E. ANDERSON
BY W. E. Williams

ATTORNEY.

Patented Apr. 27, 1948

2,440,532

UNITED STATES PATENT OFFICE 2,440,532

CLAMPING DEVICE FOR CABLES AND WIRES AND RODS

John Edwin Anderson, Los Angeles, Calif.

Application February 1, 1944, Serial No. 520,699

2 Claims. (Cl. 24—135)

This invention relates to clamping devices and more particularly to clamps of the type used to hold two cables, or two parts of the same cable, together in side by side relationship and with such security as to insure against axial movement with respect to each other. Clamps of this type are known in the trade as "cable clips."

An object of my invention is to provide a clamp of the character described which operates upon the principle of gripping each of the two clamping members separately and individually, instead of by squeezing the two clamped members against each other in the manner in which more conventionally constructed cable clips operate.

A common fault with clamps heretofore used for this type of service is that they do not clamp or contact the entire circumferential area of the cables to be clamped and therefore seriously distort that cross section of the cable on which the greatest pressure of the clamp takes place. With my device that sort of distortion does not take place to any appreciable extent.

An object of my invention is to provide fastening means for clamps which provide a quick and secure fastening and release to suit the convenience and necessity of quick application and quick removal and at the same time provide an equal clamping pressure against each body which is being clamped securely and immovably with respect to its neighbor.

Another object of my invention is to provide an improved form of clamp which is specifically designed for use in interconnecting two cables, or two parts of the same cable, but which is adapted for use with equal advantage in connection with wires, ropes, rods, and the like.

Another object of the invention is to provide suitable surface contacting materials in the faces of my clamping blocks which will minimize distortion and injury to any coating which may be upon the surfaces of the articles clamped.

Reference will be had to the accompanying drawings in which.

Figure 1:
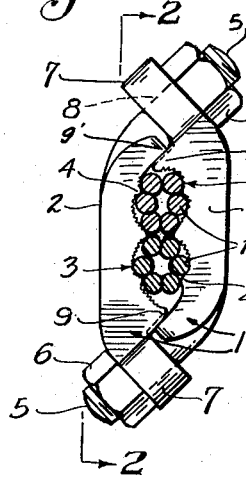
Fig. 1 is a side elevation of my clamp in one of its forms, being the form in which it will be used in a wide variation of work.
Figure 2:
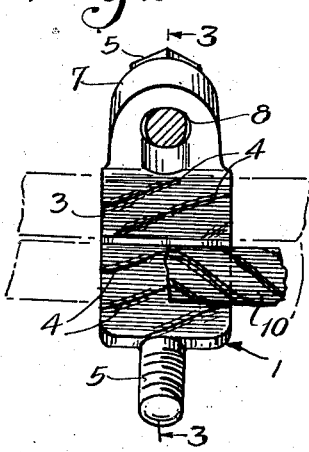
Figure 2 is a compound, sectional view taken upon the line 2—2 of Figure 1, with the direction of view as indicated, showing the right-hand clamping block of that figure in inside elevation.
Figure 3:
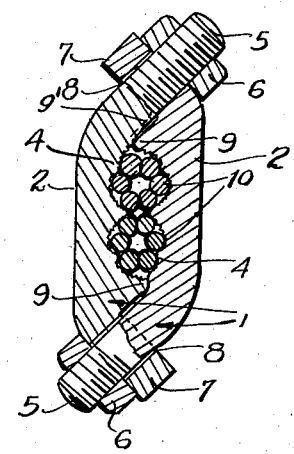
Figure 3 is a central section on what corresponds to line 3—3 of Figure 2 when the clamps are locked together on the cables.

Referring first to that modification of my invention which is illustrated in Figures 1 to 3, inclusive, my improved clamp comprises a pair of clamping members which preferably are of identical form, thereby minimizing production costs by requiring but a single set of dies for the production of both parts. Each clamping member 1 comprises a central body portion 2, the inner face of which constitutes its gripping jaw and is provided with a pair of cable-receiving sockets in the form of transversely extending grooves 3 closely adjacent each other but distinctly separated from each other since each is of substantially complete semi-circular, cross-sectional form, as is clearly shown in Figures 1 and 3. Each of the sockets 3 of each body member 2 registers with a socket 3 of the other member 2 with the result that each pair of aligned, or registering, semi-circular grooves 3 co-operate to define a cable-receiving socket of substantially full circular cross-sectional form so that a cable part 10 engaged therein will be contacted by the walls of the body members 2 which define the grooves or sockets 3 in contact with the cable part 10 throughout nearly the entire circumference of the cable.

Those portions of the body members 2 which define the grooves 3 are provided with ribs 4 protruding through the otherwise smooth surfaces and arranged in spiral form at such pitch that they are adapted to fit into the grooves between the spirally extending strands of the cables 10 being gripped by the clamp and thus further increase the extent of the area of contact between the gripping jaws and the cables.

Each of the body portions 2 is provided with a bolt 5 on one end thereof and extending from the associated body portion at an oblique angle; and each body portion 2 is also provided with a lug on the opposite end thereof from the associated bolt 5 and also at an oblique angle. Whereas the exact degree of angularity between the bolt and the body portion and between the lug and the body portion is not of great importance, the principal requirement in this connection is that these two angles shall be substantially complementary to each other, i. e., the total of the two added together should be substantially ninety degrees and in their preferable arrangement each of these two angles is of substantially forty-five degrees. When so arranged, a hole 8 through each of the lugs 7, perpendicular to both faces thereof, is substantially parallel to the bolt 5 formed on that same body portion 2. This permits the two body portions 2 to be placed together in face to face relationship with the bolt 5 of each body portion extending slidably through the hole 8 of the other body portion 2 with the result that each bolt 5 serves as a guide for movement of the body portions 2 toward and away from each other, as clearly indicated on Figures 1 and 3. Nuts 6 are threaded on the outer ends of the bolts 5 and engage the outer faces of the lugs 7, with the result that by tightening the nuts 6 the two body portions 2 can be forced to move obliquely toward each other in such a manner as to grip two cable parts 10 engaged respectively in the two sockets defined by the grooves 3. Because of the oblique nature of the movement of the body portions 2 toward each other with respect to a plane containing the axes of both the cable parts 10, the cables are gripped in a rotating action about the axes of the cables, operating in a clockwise direction, as viewed in both Figures 1 and 3, which has been found to develop a mechanical joint of maximum mechanical strength between the clamp and the cables 10 with a minimum of distortion of the cables.

Particularly should it be observed that both body portions 2 engage both cables 10 and tightening the nuts 6 of the clamp does not result in squeezing the two cables against each other. Because of this separate and individual compression of each cable, the tendency for the cable sections engaged within the clamp to be crushed to the extent of distortion thereof from true circular cross-sectional configuration is minimized.

The body portion 2 of each clamping member 1 is provided with a projection 9 on its inner face adjacent the base of the associated lug 7. One side of this projection 9 is curved to conform with the curvature of the proximal cable-receiving socket of which it forms an extension; whereas the opposite side of the projection 9 is flat and extends at an angularity of substantially ninety degrees from the inner face of the associated lug 7. Hence, this side of the projection 9 is parallel to the bolt 5 of the opposite clamping member 1 which extends through the hole 8 in the associated lug 7 adjacent whose base that projection 9 is situated. The parts are so proportioned and arranged that this flat side of each of the projections 9 slidably supports a complementarily inclined flat surface 9' adjacent the base of the bolt 5 of the opposite clamping member 1. These two slidably interengaged flat surfaces at each end of the clamp serve to guide the members 1 as they are drawn toward each other, and thus cooperate with the angularly disposed bolts 5 and bolt holes 8 in ensuring the oblique movement of the member 1 with respect to the plane containing the axes of both cables 10, which oblique movement is an important factor in developing the unusually efficient clamping action with minimum distortion of the cable which characterizes the clamp of the present invention.

Figure 4:
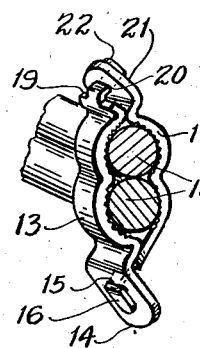
Fig. 4 is a modified form which will be made out of metal stampings from sheet metal and adapted to be used in situations of electrical connections as well as other places.

Fig. 4 shows my invention as having the parts made out of metal stampings.

This type of clamping, as shown by Fig. 4, is highly desirable for the clamping of small wires for electrical connections wherein there is no great longitudinal strain on the parts clamped.

Cheapness of construction and ease of application and removal are the desired services accomplished by this form of my invention.

The body portion, see Fig. 4, of the left hand piece 13 as shown in the drawings, is provided with the bottom lug 14 in which there is an opening 15 into which a projection 16 of the right hand portion 17 is interlocked when the pieces are assembled on the wires 18.

The upper end of the body 13 is provided with a projection 19 which is bent over and threaded through an opening 20 in the upper lug 21 of the right hand piece 17. In assembling these parts the projection 19 is in angular position facing the lug 21 and is straight in outline, and when the parts are pressed together tightly, the outer end 22 of the projection 19 is bent over, thus locking the parts together.

Figure 5:
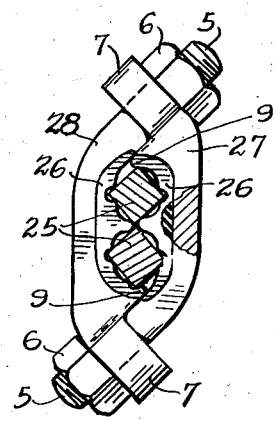
Fig. 5 is an elevational view indicating a modified form showing the clamping of square and special forms of rods in which there are elastic surfaces lining the clamping jaws.

The clamp illustrated in Figure 5 is substantially like that shown in Figs. 1 to 3, inclusive, in so far as the clamping means of the two parts are concerned, but the variations of the clamp in Fig. 5 from that of the first three figures relate to the clamping surfaces on the gripping surfaces of the clamping body.

In this form the clamp is shown as clamping square bars 25. Such bars are usually smooth and are not normally compressible as to cross-sectional form. Therefore it takes more actual pressure of the clamp against the members being gripped to keep the bars from slipping through the clamp than is required when stranded cables are being gripped. Therefore I provide a lining 26 for the clamping surfaces on the gripping surfaces of the body pieces 27 and 28 for this clamp.

I prefer to make this lining 26 out of material which is somewhat elastic. For certain cases I will make it of rubber, vulcanized or otherwise suitably fastened to the body pieces 27 and 28.

Figure 6:
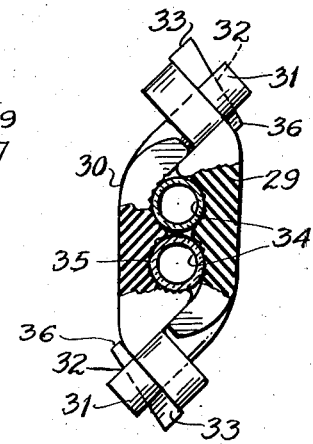
Fig. 6 is another modified form, partly in sectional elevation, in which my clamp is used for rigidly interconnecting two glass tubes or other fragile members, and in which I provide clamping surfaces cushioned with rubber or other elastic material to prevent slippage and breakage of the material clamped.

Referring now to the modification of my invention illustrated in Figure 6, the body portions 29 and 30 are similar in form to the corresponding elements of the clamp of Figures 1 to 3, inclusive. However, instead of being forced toward one another by means of nuts threaded on bolts, this modification employs wedges 33 which pass slidably through diametrically extending slots 32 in the outer ends of substantially smooth pins 31 which are employed in place of the threaded bolts 5 of the first described modification.

A special and a desirable service for this sort of clamp, see Fig. 6, is for clamping tubes, particularly glass tubes, as is required for the mounting of neon tubes or any other tubing here indicated by 34.

Instead of tubes being clamped, insulated wires may be so clamped as desired by the mechanisms herein shown. When tubes made of fragile materials are clamped, the inner faces, or clamping jaws of the bodies 29 and 30 will be coated with rubber or other elastic material 35. Thus, what is indicated at 35 may be insulation on wires being so clamped or may be elastic material for clamping glass or other forms of tubing as suits the convenience of the user.

When this clamp as shown by Fig. 6 is used, the wedges 33 are made of material which permits the bending over of the ends 36 of the wedges 33 for preventing the displacement of the wedges which would loosen the clamping service of this type of clamp.

What I claim is:

1. A clamp of the character described comprising a pair of body portions arranged in face-to-face relation, a perforated lug on one end of each of said body portions, means on each of said body portions extending angularly therefrom and slidable through the perforation in said lug on the other of said body portions for forcing said body portions toward each other, each of said body portions having a plurality of grooves extending transversely thereof in its inner face, said grooves of each of said body portions registering, respectively, with those of the other of said body portions whereby said grooves are arranged in pairs with each of said pairs of grooves defining a socket for the reception of a member to be clamped and whereby each of a plurality of said members is individually and separately clamped by both of said body portions when said forcing means is actuated, the angularity of each of said forcing means with respect to the plane containing the axes of said members being oblique, and a projection on each of said body portions having a flat face disposed at an oblique angle with respect to the associated body portion and parallel to said forcing means of the other of said body portions, each of said flat, oblique faces slidably engaging a complementarily oblique flat surface on the other body portion parallel to and adjacent the base of said forcing means on said other body portion, whereby actuation of said forcing means results in engagement of said body portions with each of said members in an oblique, rotating action about the axis of said member.

2. A clamp of the character described comprising a pair of body portions arranged in face-to-face relation, a perforated lug on one end of each of said body portions, and means on each of said body portions extending angularly therefrom and slidable through the perforation in said lug on the other of said body portions for forcing said body portions toward each other, each of said body portions having a plurality of grooves extending transversely thereof in its inner face, said grooves of each of said body portions registering, respectively, with those of the other of said body portions whereby said grooves are arranged in pairs with each of said pairs of grooves defining a socket for the reception of a member to be clamped and whereby each of a plurality of said members is individually and separately clamped by both of said body portions when said forcing means is actuated, the angularity of each of said forcing means with respect to its associated body portion and with respect to the plane containing the axes of said members being oblique whereby actuation of said forcing means results in engagement of said body portions with each of said members in a rotating action about the axis of said member.

JOHN EDWIN ANDERSON.

REFERENCES CITED

The following references are of record in the file of this patent:

UNITED STATES PATENTS

| Number | Name | Date |
| --- | --- | --- |
| 903,594 | Maddrell et al. | Nov. 10, 1908 |
| 923,558 | Mockbee | June 1, 1909 |
| 1,183,767 | Radtke | May 16, 1916 |
| 1,824,387 | Becker | Sept. 22, 1931 |
| 1,976,533 | Affleck et al. | Oct. 9, 1934 |
| 2,090,557 | Sparks | Aug. 17, 1937 |
| 2,185,723 | Buckner | Jan. 2, 1940 |
| 2,340,712 | Tinnerman | Feb. 1, 1944 |